United States Patent
Futamura et al.

(10) Patent No.: US 8,174,646 B2
(45) Date of Patent: May 8, 2012

(54) LIQUID CRYSTAL PANEL AND LIQUID CRYSTAL DISPLAY

(75) Inventors: Kazunori Futamura, Ibaraki (JP);
Junichi Nagase, Ibaraki (JP); Hiroyuki Yoshimi, Ibaraki (JP); Masaki Hayashi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 375 days.

(21) Appl. No.: 12/440,483

(22) PCT Filed: Oct. 16, 2007

(86) PCT No.: PCT/JP2007/070140
§ 371 (c)(1),
(2), (4) Date: Mar. 9, 2009

(87) PCT Pub. No.: WO2008/050632
PCT Pub. Date: May 2, 2008

(65) Prior Publication Data
US 2010/0060831 A1    Mar. 11, 2010

(30) Foreign Application Priority Data

Oct. 27, 2006  (JP) .................................. 2006-292009
Nov. 27, 2006  (JP) .................................. 2006-318081

(51) Int. Cl.
*G02F 1/1335* (2006.01)
(52) U.S. Cl. ........................................................ 349/97
(58) Field of Classification Search .................. None
See application file for complete search history.

(56) References Cited

U.S. PATENT DOCUMENTS

| 5,958,596 A * | 9/1999 | Claussen et al. ............... 428/426 |
| 2005/0285286 A1 | 12/2005 | Shuto et al. |
| 2006/0082708 A1 | 4/2006 | Nagase et al. |
| 2006/0164580 A1 | 7/2006 | Ueda et al. |
| 2007/0092663 A1 * | 4/2007 | Murakami .................... 428/1.31 |
| 2007/0206282 A1 | 9/2007 | Miyatake et al. |

(Continued)

FOREIGN PATENT DOCUMENTS

CN    1715968 A    1/2006

(Continued)

OTHER PUBLICATIONS

International Search Report of PCT/JP2007/070140, mailing date of Nov. 20, 2007.

(Continued)

*Primary Examiner* — Tina Wong
(74) *Attorney, Agent, or Firm* — Westerman, Hattori, Daniels & Adrian, LLP (57) ABSTRACT

A liquid crystal panel of the present invention comprise a liquid crystal cell, a first polarizer arranged on one of both sides of the liquid crystal cell, and a second polarizer arranged on the other side of the liquid crystal cell, wherein at least one of the first and the second polarizers is dyed with a dichroic material, and the dichroic ratio thereof is from 40 to 100. At least one of the polarizers preferably has a polarization degree of 99% or more and a single transmittance of 35% to 45%. Further, at least one of the polarizers preferably exhibits the following birefringence: $\Delta n_{xy}$ is from 0.015 to 0.030.

The liquid crystal panel of the present invention has the above polarizers, therefore the liquid crystal panel attains high contrast ratio in oblique directions and excellent display characteristics.

21 Claims, 4 Drawing Sheets

U.S. PATENT DOCUMENTS

2008/0018007 A1    1/2008    Nagase et al.

FOREIGN PATENT DOCUMENTS

| | | |
|---|---|---|
| JP | 7-120618 A | 5/1995 |
| JP | 2001-166135 A | 6/2001 |
| JP | 2003-240944 A | 8/2003 |
| JP | 2006-23573 A | 1/2006 |
| JP | 2006-47978 A | 2/2006 |
| JP | 2006-119203 A | 5/2006 |
| JP | 2006-234848 A | 9/2006 |
| TW | 200602696 A | 1/2006 |
| TW | 200615595 A | 5/2006 |

OTHER PUBLICATIONS

Japanese Office Action dated Oct. 28, 2011, issued in corresponding Japanese Patent Application No. 2006-318081. Partial English translation.

Taiwanese Office Action dated Oct. 7, 2011, issued in corresponding Taiwanese Patent Application No. 096138984. Partial English translation.

* cited by examiner

LIQUID CRYSTAL PANEL AND LIQUID CRYSTAL DISPLAY

TECHNICAL FIELD

The present invention relates to a liquid crystal panel used to a liquid crystal display or the like, and a liquid crystal display.

BACKGROUND ART

A liquid crystal display (hereinafter, also referred to as "LCD") is an apparatus that displays characters and images using electro-optical properties of liquid crystal molecules. In the LCD, a liquid crystal panel in which polarizing plates are arranged on both sides of a liquid crystal cell is generally installed.

The polarizing plate has a polarizer. As the polarizer, a polyvinyl-alcohol-based drawn film dyed with a dichroic material is widely used. Individual polarizing plates arranged on both sides of the liquid crystal cell in such a manner that the cell is sandwiched between the polarizing plates are usually arranged to make the absorption axes of their polarizers perpendicular to each other.

The liquid crystal panel makes it possible to display a black image when no voltage is applied to the panel in the case where its liquid crystal cell is in a normally black mode.

Incidentally, LCD generally has a problem that a contrast ratio in oblique directions is low. In order to solve this problem, the liquid crystal panel is provided with a retardation film (see, for example, Patent Document 1).

However, in the market, the performance of LCD is strongly desired to be made higher. In other words, a liquid crystal display exhibiting a higher contrast ratio, which makes it possible to cause characters or images to be vividly viewed from oblique directions is desired.

Patent Document 1: Japanese Patent No. 3648240

DISCLOSURE OF THE INVENTION

An object of the present invention is to provide a liquid crystal panel and a liquid crystal display wherein a contrast ratio is high in oblique directions.

It is generally considered that in the case of designing a liquid crystal panel, a polarizer having a higher dichroic ratio is better. The inventors have made eager investigations so as to find out that, contrary to a stereotype that a polarizer having a high dichroic ratio should be used, the above-mentioned object can be attained by use of a polarizer having a lower dichroic ratio than a polarizer in the prior art.

Consequently, the present invention provides a liquid crystal panel comprising a liquid crystal cell, a first polarizer arranged on one of both sides of the liquid crystal cell, and a second polarizer arranged on the other side of the liquid crystal cell, wherein at least one of the first and the second polarizers is dyed with a dichroic material, and a dichroic ratio thereof is from 40 to 100.

By use of the polarizer wherein the dichroic ratio is in the above range in the liquid crystal panel of the present invention, a contrast ratio in oblique directions becomes remarkably higher than liquid crystal panels in the prior art. The liquid crystal display of the present invention provided with this liquid crystal panel makes it possible to make the viewing angle thereof wide, so as to have an excellent image-viewability.

A preferable embodiment of the present invention provides a liquid crystal panel, wherein at least one of the above first and second polarizers exhibits a polarization property that the polarizer has a polarization degree of 99% or more and a single transmittance of 35% to 45%.

A preferable embodiment of the present invention provides a liquid crystal panel, wherein at least one of the above first and the second polarizers exhibits the following birefringence: $\Delta n_{xy}$ is from 0.015 to 0.030.

However, $\Delta n_{xy}$=nx−ny. The nx represents an in-plane refractive index of the polarizer in the X axis direction thereof and the ny represents an in-plane refractive index of the polarizer in the Y axis direction thereof. The X axis direction is the direction in which an in-plane refractive index of the polarizer is maximum and the Y axis direction is the direction perpendicular to the X axis direction.

A preferable embodiment of the present invention provides a liquid crystal panel, wherein at least one of the first and the second polarizers comprises a drawn polymer film dyed with a dichroic material.

A preferable embodiment of the present invention provides a liquid crystal panel, wherein the above drawn polymer film dyed with the dichroic material is a film obtained through at least a) a step of swelling a non-drawn hydrophilic polymer film, b) a step of dyeing the swelled polymer film with the dichroic material, c) a step of crosslinking the dyed polymer film, d) a step of washing the crosslinked polymer film, and e) a step of drawing the polymer film into a length 3 to 5 times longer than the original length of the polymer film in a period from the swelling step to the washing step.

A preferable embodiment of the present invention provides a liquid crystal panel, wherein the drawn polymer film comprises a polyvinyl-alcohol-based film, and the dichroic material contains iodine.

A preferable embodiment of the present invention provides a liquid crystal panel which has a panel size of 70 inches or more.

A preferable embodiment of the present invention provides a liquid crystal panel, wherein the above liquid crystal cell contains liquid crystal molecules aligned to homeotropic alignment when no electric field is applied thereto.

A preferable embodiment of the present invention provides a liquid crystal panel which comprises a retardation layer between the above liquid crystal cell and the first or the second polarizer.

An index ellipsoid of the retardation layer preferably satisfies the following relationship: nx≧ny>nz. Also, an Nz coefficient of the retardation layer is from 1.1 to 8.0. Furthermore, the retardation layer contains at least one resin selected from the group consisting of polyimide-based resin, polyester-based resin, norbornene-based resin, and cellulose-based resin. Particularly preferably, the retardation layer comprises a polyimide-based resin layer and a cellulose-based resin layer.

Furthermore, the present invention provides a liquid crystal display comprising any one of the above liquid crystal panels.

DETAILED DESCRIPTION OF THE INVENTION

The present invention will be described hereinafter.

<Liquid Crystal Panel>

In a liquid crystal panel of the present invention, polarizers (a first polarizer and a second polarizer) are arranged on both sides of a liquid crystal cell, respectively. In the liquid crystal panel, preferably, a retardation layer is further arranged between the first and the second polarizers. Constitution of the liquid crystal cell, the polarizers, and the retardation layer will be described in detail later.

Preferably, the first polarizer is arranged on the viewing side of the liquid crystal cell, and the second polarizer is arranged on the side opposite to the viewing side of the liquid crystal cell. Preferably, the first polarizer is arranged to make the absorption axis direction thereof substantially perpendicular to the absorption axis direction of the second polarizer.

In the present specification, polarizers arranged on both sides of the liquid crystal cell, respectively, are called a "first polarizer" and a "second polarizer" in order to distinguish the polarizers from each other. However, the terms "first" and "second" never mean any order of polarizers in arrangement, superiority, or the like.

A size of the liquid crystal panel (a screen size of a viewing surface of the liquid crystal panel) is not particularly limited, and may be appropriately designed in accordance with the use purpose thereof. The present invention may be applied to liquid crystal panels having the screen sizes of which are from relatively small sizes to relatively large sizes. It is particularly effective that the present invention is applied to liquid crystal panels having a relatively large screen. Specifically, the size of the liquid crystal panels (a length of diagonal lines of the viewing surface thereof) is, for example, 70 inches or more, and is preferably 80 inches or more, particularly preferably 100 inches or more.

The present invention makes it possible to provide a liquid crystal panel wherein a contrast ratio in oblique directions is high even when the panel has a relatively large screen.

<Liquid Crystal Cell>

For a liquid crystal cell of the present invention, arbitrary one may be employed. Examples of the liquid crystal cell include an active matrix type using a thin film transistor, a simple-matrix type employed on super twisted nematic liquid crystal display, and the like.

The liquid crystal cell preferably has a pair of substrates, and a liquid crystal layer, as a display medium, sandwiched between the substrate pair. In general, on one of the substrates (active matrix substrate) is provided switching elements for controlling electro-optical characteristics of the liquid crystal (typically, TFTs), scanning lines for giving gate signals to the switching elements, and signal lines for giving source signals thereto. On the other substrate (color filter substrate) is provided a color filter.

Here, the color filter may be provided to the active matrix substrate. Alternatively, for example, when a tricolor light source of RGB is used as an illuminating means for a liquid crystal display (field sequential system), the color filter may be omitted. The tricolor light source of RGB may further include a multicolor light source. An interval between the pair of substrates is controlled by a spacer. An orientation film consisted, for example, of polyimide, is provided to the side where each substrate contacts with the liquid crystal layer. Alternatively, the orientation film may be omitted, for example, in the case where initial orientation of liquid crystal molecules is controlled by utilizing fringe field formed by pattered transparent electrodes.

The liquid crystal cell preferably contains liquid crystal molecules aligned to homeotropic alignment. In the present specification, the "homeotropic alignment" means that an alignment vector of liquid crystal molecules is aligned perpendicularly (in the normal direction) to planes of a substrate by a result of interaction between the substrate subjected to alignment treatment and the liquid crystal molecules.

The homeotropic alignment also includes an alignment of the case where the alignment vector of the liquid crystal molecules is slightly inclined from the normal direction of the substrate, that is, the case where the liquid crystal molecules have a pretilt. When the liquid crystal molecules have the pretilt, a pretilt angle thereof (angle from the normal direction of the substrate) is preferably 5 degrees or less. When the pretilt angle is set to 5 degrees or less, a liquid crystal display wherein a contrast ratio is high can be obtained.

In the liquid crystal cell, an index ellipsoid thereof preferably has a relationship of $nz>nx=ny$. As the liquid crystal cell having the index ellipsoid of $nz>nx=ny$, a vertical alignment (VA) mode, a twisted-nematic (TN) mode, a vertically-aligned electric field control birefringence (ECB) mode, an optical compensation birefringence (OCB) mode, and the like may be exemplified. The above liquid crystal cell is preferably the VA mode.

Here, the nx represents an in-plane refractive index of the liquid crystal layer in the X axis direction, the ny represents an in-plane refractive index of the liquid crystal layer in the Y axis direction, and the nz represents a refractive index in the direction perpendicular to the X axis and the Y axis direction. The X axis direction means the direction that an in-plane refractive index of the liquid crystal layer is maximum, and the Y axis direction is the direction perpendicular to the X axis direction in the plane of the liquid crystal layer.

The liquid crystal cell of the VA mode utilizes a voltage control birefringence effect. Such the liquid crystal cell of the VA mode makes liquid crystal molecules aligned in homeotropic alignment in the absence of electric field, respond to electric field in the normal direction to the substrate. Specifically, as for the liquid crystal cell of the VA mode arranged to make the absorption axes of polarizing plates perpendicular to each other, when the liquid crystal cell operates according to a normally black system, liquid crystal molecules are aligned in the normal direction to the substrate in the absence of electric field, so that a screen displays in black. On the other hand, in the presence of electric field, the liquid crystal cell of the VA mode operates so that the liquid crystal molecules are inclined at an azimuth of 45° with respect to the absorption axes of polarizing plates. Therefore, a transmittance is increased, and the screen displays in white. As for the liquid crystal cell of the VA mode, concrete disclosures are found, for example, in Japanese Patent Application Laid-Open Publication No. S62-210423, Japanese Patent Application Laid-Open Publication No. H4-153621, and the like.

In the liquid crystal cell of the VA mode, electrodes in which a slit is formed are used. Alternatively, the liquid crystal cell may be formed multi-domains by using a substrate formed projections on the surface thereof. Such the liquid crystal cells may be those that are described in Japanese Patent Application Laid-Open Publication No. H11-258605.

Examples of such liquid crystal cell include "ASV (Advanced Super View) mode" (trade name) manufactured by Sharp Corporation, "CPA (Continuous Pinwheel Alignment) mode" (trade name) manufactured by Sharp Corporation, "MVA (Multi-domain Vertical Alignment) mode" (trade name) manufactured by Fujitsu Ltd., "PVA (Patterned Vertical Alignment) mode" (trade name) manufactured by Samsung Electronics Co., Ltd., "EVA (Enhanced Vertical Alignment) mode" (trade name) manufactured by Samsung Electronics Co., Ltd., "SURVIVAL (Super Ranged Viewing by Vertical Alignment) mode" (trade name) manufactured by Sanyo Electric Co., Ltd., and the like.

As the liquid crystal cell of the present invention, for example, a liquid crystal cell installed in a commercially available liquid crystal display may be used as it is. Examples of the commercially available liquid crystal display equipped with the liquid crystal cell of the VA mode include a liquid crystal TV manufactured by Sharp Corporation under the trade name of "AQUOS series", a liquid crystal TV manufactured by Sony Corporation under the trade name of "BRAVIA series", a 32V-inch wide model liquid crystal TV manufactured by Samsung Electronics Co., Ltd. under the trade name of "LN32R51B", a liquid crystal TV manufactured by Nanao Corporation under the trade name of "FORIS SC26XD1", a liquid crystal TV manufactured by AU Optronics Corporation under the trade name of "T460HW01", and the like.

<Polarizer>

In the present specification, the "polarizer" means an optical member for converting natural light or polarized light to linearly polarized light. The polarizer preferably has the function of separating incident light to two polarized light components perpendicular to each other, transmitting one of the polarized light components, absorbing, reflecting and/or scattering the other polarized light components.

The polarizers in the present invention are arranged on both sides (the viewing side and the side opposite to the viewing side) of the liquid crystal cell, respectively.

Preferably, the first polarizer is arranged on the viewing side of the liquid crystal cell, and the second polarizer is arranged on the side opposite to the viewing side of the liquid crystal cell. The first polarizer arranged on the viewing side is preferably set up to make the absorption axis thereof parallel to long sides of a liquid crystal panel that is in a rectangular form.

The polarizer used in the present invention satisfies a dichroic ratio ranging from 40 to 100, preferably from 45 to 95, more preferably from 50 to 70. When the polarizer, which exhibits the dichroic ratio in this range, is used, a contrast ratio become remarkably good in oblique directions of the liquid crystal display. This finding has never been discovered until the inventors' discovery. Specifically, if the dichroic ratio is less than 40, a polarization property becomes low. On the other hand, if the dichroic ratio is more than 100, the effect of making the contrast ratio in the liquid crystal display remarkably good is not sufficiently produced.

The cause that the contrast ratio becomes good in the liquid crystal display using the polarizer in which the dichroic ratio is in the above-mentioned range is unclear; however, the inventors suppose as follows: in the polarizer of the present invention, a dichroic material (a iodine complex in the case of using iodine) is partially aligned in directions oblique to the drawing direction, and this dichroic material absorbs light in the oblique directions, thereby making the contrast ratio good. When a liquid crystal display using a polarizer in the prior art displays a black image, light in oblique directions is transmitted so that light leakage is generated; therefore, it is difficult that a true black display is realized. However, when a liquid crystal display using the polarizer in the present invention displays a black image, light leakage in oblique directions can be effectively prevented so that the high contrast ratio can be realized.

In the present invention, a polarizer exhibiting a dichroic ratio in the above-mentioned range is used as at least one of the first and the second polarizers. Preferably, a polarizer exhibiting the dichroic ratio in the above-mentioned range is used as the first polarizer arranged on the viewing side. Particularly preferably, a polarizer exhibiting the dichroic ratio in the above-mentioned range is used as each of the first and the second polarizers.

Here, "dichroic ratio" is defined as follows: $DR=A(\perp)/A(\|)$ wherein DR represents the dichroic ratio, $A(\perp)$ represents the absorbance of a perpendicular laminated polarizer formed by putting two identical polarizers onto each other to make their absorption axes perpendicular to each other, and $A(\|)$ represents the absorbance of a parallel laminated polarizer formed by putting the two identical polarizers onto each other to make their absorption axes parallel to each other.

A specific method for measuring the dichroic ratio is as will be described in Examples.

The dichroic ratio can be adjusted into a desired range in accordance with the draw ratio, or a transmittance of the polarizer. A polarizer having a high dichroic ratio can be obtained, for example, by making the draw ratio high in the production process. On the other hand, a polarizer having a low dichroic ratio can be obtained by making the draw ratio low. Also, a polarizer having a high dichroic ratio can be obtained by making the transmittance of the polarizer high by making the concentration of a dichroic material (for example, the concentration of iodine) in a dyeing bath low in the production process. On the other hand, a polarizer having a low dichroic ratio can be obtained by making the transmittance of the polarizer low by making the dichroic material concentration high. The dichroic ratio can be adjusted into a desired range by controlling both of the draw ratio and the dichroic material concentration also.

A thickness of the first polarizer and the second polarizer is usually from 5 µm to 50 µm, preferably from 10 µm to 50 µm. When the thickness of the polarizers is set into the range, polarizers excellent in mechanical strength can be obtained.

A single transmittance (T) of the polarizer(s) (the first polarizer and/or the second polarizer) in the present invention is preferably from 35% to 45%, more preferably from 39% to 42%. When the single transmittance is set into the range, a liquid crystal display wherein the contrast ratio in oblique directions is far higher can be obtained.

Here, the single transmittance is the Y value of tristimulus values based on the two-degree-field according to JIS Z 8701-1995.

A parallel transmittance of the polarizer(s) is preferably from 27% to 36%, more preferably from 28% to 34%. A perpendicular transmittance of the polarizer(s) is preferably less than 0.0030%, more preferably 0.0028% or less, particularly preferably 0.0025% or less. By using the polarizer(s) having the parallel transmittance and the perpendicular transmittance in the range, a liquid crystal display wherein a contrast ratio in oblique directions is remarkably high can be obtained.

The perpendicular transmittance of the polarizer(s) at wavelength of 440 nm is preferably 0.020% or less, more preferably 0.010% or less. Further, the perpendicular transmittance of the polarizer(s) at wavelength of 550 nm is preferably less than 0.002%, more preferably 0.0014% or less. The perpendicular transmittance of the polarizer(s) at wavelength of 650 nm is preferably less than 0.003%, more preferably 0.0014% or less. By using a polarizer wherein the perpendicular transmittances at the individual wavelengths are in the range, a liquid crystal display can be obtained wherein light leakage is restrained in the range of overall wavelengths of visible rays and the contrast ratio in oblique directions is higher. A specific method for measuring the parallel transmittance and the perpendicular transmittance is as will be described in Examples.

A polarization degree (P) of the polarizer(s) in the present invention is preferably 99% or more, more preferably 99.5% or more. By using a polarizer having the polarization degree in the range, a liquid crystal display wherein the contrast ratio in oblique directions is higher can be obtained.

The polarization degree may be measured by use of a spectrophotometer (product name: "DOT-3", manufactured by Murakami Color Research Laboratory Co., Ltd.). A specific method for measuring the polarization degree is as will be described in Examples.

A $\Delta n_{xy}[1000]$ of the polarizer(s) in the present invention at wavelength of 1000 nm is preferably from 0.015 to 0.030, more preferably from 0.015 to 0.025. By using the polarizer having the $\Delta n_{xy}[1000]$ in the range, a liquid crystal display wherein the contrast ratio in oblique directions is higher can be obtained.

However, the $\Delta n_{xy}$ is defined as follows: $\Delta n_{xy}=nx-ny$. The nx represents an in-plane refractive index of the polarizer in the X axis direction thereof. The ny represents an in-plane refractive of the polarizer index in the Y axis direction thereof. The X axis direction is the direction in which an in-plane refractive index of the polarizer is maximum, and the Y axis direction is the direction perpendicular to the X axis direction.

An in-plane retardation value of the polarizer(s) at wavelength of 1000 nm is preferably from 400 nm to 850 nm, more preferably from 500 nm to 800 nm. Here, the in-plane retardation value is calculated by product of the in-plane birefringence index ($\Delta n_{xy}[1000]$) and thickness (d (nm)). The in-plane retardation value of the polarizer at wavelength of 1000 nm=$\Delta n_{xy}[1000]\times d$. By using a polarizer wherein the in-plane retardation value is in the range, a liquid crystal display wherein the contrast ratio in oblique directions is remarkably high can be obtained.

The polarizer(s) in the present invention satisfying the above-mentioned range of the dichroic ratio, and the like is preferably a drawn polymer film dyed with a dichroic material since the drawn polymer film can be produced with relative ease.

Specifically, it is preferable to use, as the polarizer(s) in the present invention, a drawn polymer film(s) obtained through steps described below.

That is to say, the polarizer(s) in the present invention can be obtained through a step of swelling a non-drawn hydrophilic polymer film, a step of dyeing the swelled polymer film with a dichroic material, a step of crosslinking the dyed polymer film, a step of washing the crosslinked polymer film, and a step of drawing the polymer film at a total draw ratio of 3 to 5 times in a period from the swelling step to the washing step.

<Hydrophilic Polymer Film>

The above-described hydrophilic polymer film is not particularly limited, so that various ones can be used. In general, the hydrophilic polymer film may be a film obtained by forming a resin composition containing a polymer having hydrophilic groups into a film. Examples of the film include a polyvinyl-alcohol-based film (hereafter, polyvinyl alcohol will be denoted as "PVA"), a partially formalated PVA-based film, a polyethylene terephthalate, ethylene-vinyl acetate copolymer-based film, a partially saponified film of these, and the like. Furthermore, a polyene-based oriented film such as a dehydrated compound of PVA and a dehydrochlorinated compound of a polyvinyl chloride may be used. Among these, the film is preferably the PVA-based film since the film has excellent dyeability of a dichroic material. The PVA is a polymer obtained by saponifying polyvinyl acetate, wherein vinyl acetate is polymerized. The PVA-based polymer may be the above-mentioned PVA; a modified PVA, which contains a component copolymerizable with vinyl acetate, such as an unsaturated carboxylic acid, an olefin, a vinyl ether, an unsaturated sulfonate, or the like; a modified PVA that contains an acetoacetyl group, a sulfonic acid group, a carboxyl group, or the like; a modified PVA such as polyvinyl formal, polyvinyl acetal, or the like.

In the case of using the PVA-based polymer, the PVA-based polymer may be obtained by saponifying a vinyl-ester-based polymer obtained by polymerizing a vinyl ester-based monomer such as vinyl acetate. This PVA-based polymer is preferably a PVA-based polymer having a high saponification degree and a high polymerization degree since the polymer is good in heart resistance, and the like. A saponification degree of the PVA-based polymer is not particularly limited, but for example, and is preferably from 90 mol % to 100 mol %, and more preferably from 95.0 mol % to 99.9 mol %. The saponification degree can be calculated according to JIS K 6726-1994. An average polymerization degree of the PVA-based polymer is not particularly limited, but for example, and is preferably from 1000 to 8000, more preferably from 1200 to 3600, and particularly preferably 1500 to 5000. The average polymerization degree can be calculated according to JIS K 6726-1994.

The PVA-based film may be obtained by a casting method of dissolving a resin composition containing a PVA-based polymer into one or more appropriate organic solvents, such as water and/or DMSO, and forming the resin solution into a film form. The PVA-based film may also be formed into a film by a known film-forming method such as an extruding method besides the casting method.

The method for obtaining a film made mainly of the above-mentioned PVA-based polymer may be, for example, a method described in [Example 1] in JP-A-2001-315144.

An appropriate additive such as a plasticizer or a surfactant may be blended with the PVA-based-polymer-containing resin composition. Examples of the plasticizer include polyalcohol such as ethylene glycol, glycerin, or the like. Examples of the surfactant include nonionic surfactant or the like. The addition of the plasticizer or the surfactant makes it possible to obtain a PVA-based film excellent in dyeability and drawability. The additive amount of each of the plasticizer and the surfactant is more than about 1 part by mass and less than about 10 parts by mass for 100 parts by mass of the PVA-based polymer, respectively.

As the PVA-based film, a commercially available film may be used as it is. Examples of the commercially available PVA-based film include "KURARAY VINYLON FILM (trade name)" manufactured by Kuraray Co., Ltd., "TOHCELLO VINYLON FILM (trade name)" manufactured by Tohcello Co., Ltd., "NICHIGOU VINYLON (trade name)" manufactured by Nippon Synthetic Chemical Industry Co., Ltd., or the like.

(Swelling Step)

The swelling step is a step of swelling a non-drawn hydrophilic polymer film. The production process using a PVA-based film will be mainly described hereinafter; however, the polarizer(s) in the present invention is/are not limited to the production using a PVA-based film, and may be applied also to one or more different hydrophilic polymer films.

As the PVA-based film, a non-drawn film is used. An original non-drawn PVA-based film is being taken up in a roll form. The original film formed of roll is set on the upstream side of a swelling bath, and then introduced through a carrying roller into the swelling bath.

The swelling step is a step for removing stains on the surface of the PVA-based film and further swelling the PVA-based film with water to prevent introduction unevenness of a dichroic material that will be described later.

The swelling bath is full with water. As far as the advantageous effects of the present invention are not damaged, any other material may be added to the solution in the swelling bath.

A solution temperature of the swelling bath is preferably a temperature of about 20 to 50° C., more preferably a temperature of about 30 to 40° C. A period when the PVA-based film is immersed in the swelling bath is about from 1 to 7 minutes.

Water used in the swelling bath, a dyeing bath that will be described later, and other baths is preferably pure water.

(Dyeing Step)

The dyeing step is a step of impregnating (also referred to as absorbing or contacting) the swelled hydrophilic polymer film with a dichroic material.

The swelled PVA-based film is introduced into a dyeing bath after the film is pulled out from the swelling bath.

The dyeing bath is full with a dyeing solution. The dyeing solution contains water and a dichoroic material dissolved in the water. Here, in the dyeing solution, an organic solvent compatible with water may be added a little. An additive amount of the dichroic material is not particularly limited, and is preferably from 0.0001 to 5 parts by mass, more preferably 0.001 to 3 parts by mass, and particularly preferably from 0.01 to 2 parts by mass for 100 parts by mass of water.

As the dichroic material, a material known in the prior art can be used, and examples thereof include iodine, an organic dye, or the like. Examples of the organic dye include polymethine dyes, cyanine dyes, merocyanine dyes, rhodacyanine dyes, three-nucleus merocyanine dyes, aropolar dyes, hemicyanine dyes, styryl dyes, azo dyes, or the like.

These dichroic materials may be used alone or in combination of two or more thereof. The dichroic material is preferably water-soluble. As the water-soluble dichroic material, for example, an organic dye into which a hydrophilic substituent, such as a sulfonic acid group, an amino group, a hydroxyl group, or the like is introduced is used in a free-acid state thereof, or in the state of an alkali metal salt thereof, an ammonium salt thereof, or an amine salt thereof.

In particular, it is preferable to use iodine as the dichroic material. The use of iodine makes it possible to obtain easily a polarizer exhibiting a dichroic absorption property in the range of almost all wavelengths of visible rays.

When iodine is used as the dichroic material, the additive amount of iodine is preferably from 0.01 to 0.15 parts by mass, more preferably from 0.01 to 0.05 parts by mass for 100 parts by mass of water. When the additive amount of iodine is increased within this range, a polarizer having a low transmittance is obtained. When the additive amount of iodine is decreased within this range, a polarizer having a high transmittance is obtained.

An iodide may be further added to the dyeing solution. Examples of the iodide include potassium iodine, lithium iodide, sodium iodide, zinc iodide, aluminum iodide, lead iodide, copper iodide, barium iodide, calcium iodide, tin iodide, titanium iodide, or the like. The iodide is preferably potassium iodide. The additive amount of the iodide is preferably from 0.05 to 0.5 parts by mass, more preferably from 0.1 to 0.3 parts by mass for 100 parts by mass of water. When the additive amount of the iodide is set into this range, a polarizing plate having the above-mentioned transmittance and a high polarization degree can be obtained.

A reaction-aiding agent may be added to the dyeing solution since the dyeing efficiency of the dichroic material can be made far better. When iodine is used as the dichroic material, the reaction-aiding agent is preferably, for example, a boron compound such as boric acid or borax. When the organic dye is used as the dichroic material, the reaction-aiding agent is preferably, for example, sodium sulfate, or the like. When the reaction-aiding agent is used, the additive amount thereof is preferably from 0.1 to 10 parts by mass for 100 parts by mass of the water in the dyeing solution.

A period when the PVA-based film is immersed in the dyeing bath is not particularly limited, and is preferably from about 20 to 1,800 seconds. A solution temperature of the dyeing bath is preferably from about 20° C. to 60° C., and more preferably from about 30° C. to 50° C. If the temperature of the dyeing bath is too high, the film may be unfavorably melted. If the temperature is too low, the dyeability may fall. The dyeing step may be performed in two or more separated dyeing baths.

The film may be drawn in the dyeing bath(s). At this time, the draw ratio is from about 1.5 to 3.0 times.

(Crosslinking Step)

The crosslinking step is a step of impregnating the PVA-based film, which is impregnated with the dichroic material, with a crosslinking agent such as boric acid.

The PVA-based film, which is impregnated with the dichroic material, is pulled out from the dyeing bath, and then introduced into a crosslinking bath.

The crosslinking bath is full with a crosslinking solution. The crosslinking solution contains water, and a crosslinking agent dissolved in the water. An organic solvent compatible with water may be added to the crosslinking solution. The additive amount of the crosslinking agent into the crosslinking solution is not particularly limited, and is preferably from 0.5 to 10 parts by mass, more preferably from 1 to 7 parts by mass for 100 parts by mass of water.

As the crosslinking agent, a material known in the prior art can be used. Examples thereof include boron compounds such as boric acid, borax, or the like. These may be used alone or in combination of two or more thereof. The crosslinking agent preferably contains at least boric acid.

An iodide may be added to the crosslinking solution from the viewpoint that uniform in-plane properties of a polarizer can be obtained. This iodide may be appropriately selected from the exemplified iodides about the above-mentioned dyeing step. The iodide in the crosslinking solution particularly preferably contains potassium iodide. The additive amount of the iodide in the crosslinking solution is preferably from 0.5 to 10 parts by mass, more preferably from 1 to 7 parts by mass for 100 parts by mass of water.

A solution temperature of the crosslinking solution is not particularly limited, and is preferably from 20° C. to 70° C. A period when the film is immersed therein is not particularly limited, and is preferably from about 60 to 1,200 seconds, and more preferably from about 200 to 400 seconds. The crosslinking step may be performed in two or more separated crosslinking baths.

The film may be drawn in the crosslinking bath. At this time, the draw ratio is from about 2 to 4 times.

(Drawing Step)

The drawing step is a step of drawing the PVA-based film uniaxially.

The drawing treatment is preferably conducted in any one of the steps from the swelling step to the crosslinking step, or two or more steps selected from the swelling step to the washing step. Particularly preferably, in a period from the dyeing step to the washing step, the drawing treatment is conducted together with the dyeing treatment and the crosslinking treatment.

Another drawing step may be set up between the swelling step and the crosslinking step. This another drawing step is set up for conducting drawing treatment mainly. Alternatively, the above another drawing step may be set up after the crosslinking step.

According to the drawing treatment, the non-drawn PVA-based film (the PVA-based film before introduced into the swelling step) is drawn preferably about 3 to 5 times, more preferably about 4 to 5 times longer than the original length thereof (in the case where the film is subjected to the drawing treatment in two or more steps, the draw ratio suggested herein is the total draw ratio obtained by summing up the draw ratios in the all steps. The same matter is correspondingly applied to the following). A conventional polarizer is formed by drawing a film at a total draw ratio of about 6 to 7 times in order to align a dichroic material therein uniformly in the drawing direction. In the present invention, the film is drawn about 3 to 5 times, whereby a polarizer remarkably good in a contrast ratio in oblique directions can be obtained. The action principle therefor is unclear; however, when the film is drawn about 3 to 5 times, the alignment of a part of the dichroic material therein is disturbed (in other words, a part of the dichroic material is not aligned in the drawing direction), so that a polarizer having the above-mentioned dichroic ratio is obtained. In this polarizer, the part of the dichroic material is not aligned in a single direction; therefore, when a liquid crystal display using this polarizer is viewed from oblique directions, light is transmitted so that the contrast ratio can be made high.

When the film is drawn at a relatively low ratio as described above, a film having a larger width, that is, a wider polarizer can be obtained than when the film is drawn at a high ratio (of 6 to 7 times) as in the prior art. The width means a width perpendicular to the drawing direction.

Thus, according to the polarizer(s) of the present invention, a liquid crystal panel having a large size of 70 inches or more can be supplied by using the one polarizer.

Specifically, a polarizer made of a drawn film is produced by drawing a hydrophilic polymer film in which a dichroic material is adsorbed, as described above.

In producing this mechanically, an original non-drawn film having an extremely long length and a predetermined width is drawn in the longitudinal direction (MD direction). The original film 1 after the drawing treatment will contract the width and generate the absorption axis A in the drawing direction (namely, MD direction), as shown in FIG. 4A.

Figure 4A:
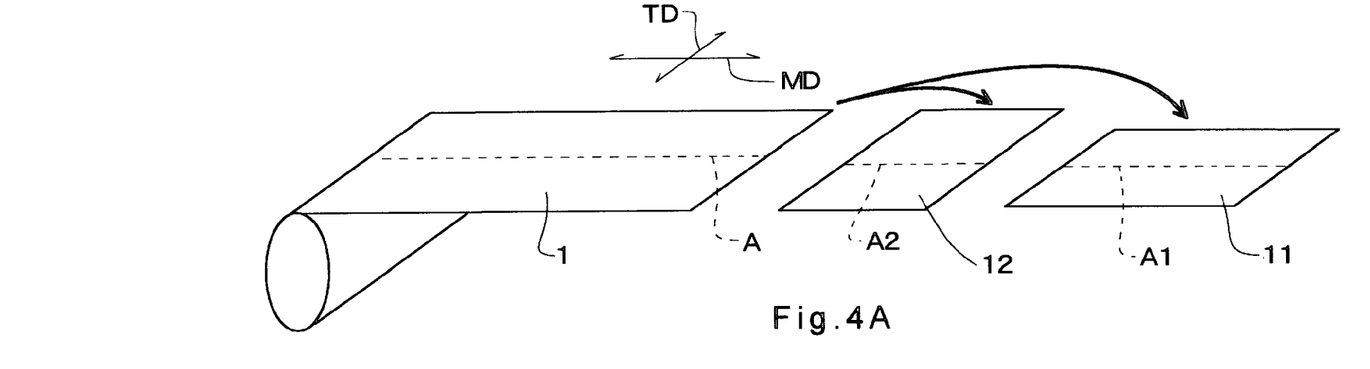
FIG. 4A is a perspective reference view illustrating a state that polarizers are cut off from a original drawn film.
Figure 4B:
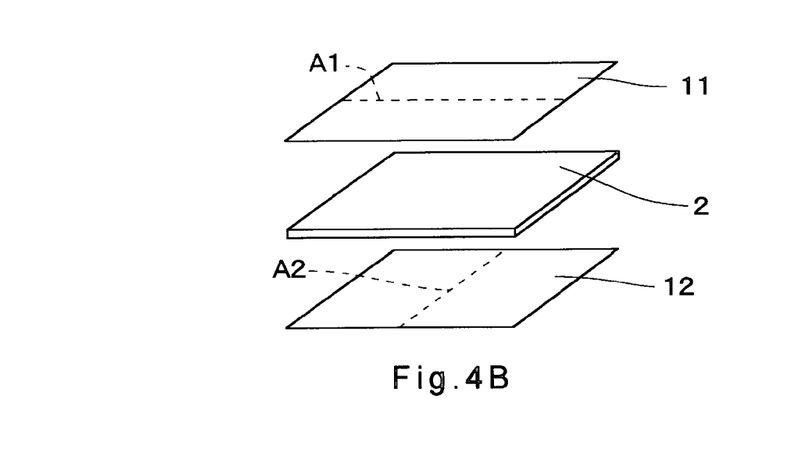
FIG. 4B is an exploded perspective reference view illustrating an arrangement of a liquid crystal cell, a viewing-side polarizer, and an opposite-side polarizer.

In a general liquid crystal panel, a viewing-side polarizer 11 and a liquid crystal cell 2 are arranged to make the absorption axis A1 of the polarizer 11 parallel to a long side of the liquid crystal cell 2, and an opposite-side polarizer 12 and the liquid crystal cell 2 are arranged to make the absorption axis A2 of the polarizer 12 perpendicular to the long side of the liquid crystal cell 2, as shown in FIG. 4B.

The viewing-side polarizer 11 and the opposite-side polarizer 12 are obtained by cutting the original film 1 in rectangular form, as shown in FIG. 4A. The opposite-side polarizer 12 is cut so that the width direction (TD direction) of the original film 1 will be a long side of the polarizer 12 as regarding to the absorption axis thereof.

Therefore, the length of the long side of the viewing-side surface of the liquid crystal panel has been restricted by the long side of the opposite-side polarizer 12, namely, the width of the original film 1. The width of the original film 1 has been a limit of the size of the liquid crystal panel.

In this regard, by use of the polarizer of the present invention, the size of the liquid crystal panel makes larger than a conventional panel since the polarizer of the present invention can be formed wider than the conventional polarizer.

Here, in the case where the drawing treatment is not conducted in any step from the swelling step to the crosslinking step but is separately set up, the method for the drawing may be wet drawing method or dry drawing method. The wet drawing method is the manner of drawing the PVA-based film in a drawing bath. The dry drawing method is the manner of incorporating water into the PVA-based film and subsequently drawing the film in the air. In the case of the wet drawing method, a solution in the drawing bath is not particularly limited, and is, for example, a solution to which one or more out of various metal salts, boron, zinc compounds, and the like are added. Examples of a solvent used in this solution include water, ethanol, or various organic solvents. A solution temperature of the drawing bath is, for example, preferably from 40 to 67° C., and more preferably from 50 to 62° C. On the other hand, when the dry drawing method is performed, the temperature is preferably from 50 to 180° C.

(Washing Step)

The washing step is a step of washing away unnecessary remnants (such as boron) adhering to the PVA-based film that has undergone the above-mentioned individual steps.

The crosslinked PVA-based film is pulled out from the crosslinking bath, and then introduced into a washing bath.

The washing bath is generally full with water. An appropriate additive may be optionally added to the solution in the washing bath.

A solution temperature of the washing bath is preferably from about 10° C. to 60° C., and more preferably from about 15° C. to 40° C. A number of treatments for the washing is not particularly limited, and the washing treatment can be conducted in plural numbers.

When the PVA-based film is pulled out from the swelling bath, the dyeing bath, the crosslinking bath, the washing bath, and other baths, it is preferable to subject the film to liquid-removing treatment in order to prevent a generation of liquid drips. For the liquid-removing treatment, for example, a pinch roll known in the prior art, or the like may be used. Alternatively, the liquid-removing treatment may be conducted by a method of knifing away the liquid with an air knife. The liquid-removing treatment makes it possible to remove an extra liquid adhering to the film.

(Drying Step)

The drying step is a step of drying the washed PVA-based film.

The washed PVA-based film is pulled out from the washing bath, and then introduced into a drying machine.

For the drying, an appropriate method may be used. Examples of the method include natural drying, wind drying, drying by heating, or the like. In general, drying by heating is preferably used. In the drying by heating, for example, a temperature of heating is preferably from about 20 to 80° C., and a period of drying is preferably from about 1 to 10 minutes.

The polarizer(s) in the present invention can be obtained by individual treating steps as described above.

In the case of a PVA-based film dyed with iodine, a content of iodine is preferably from 1.8 to 5.0% by mass, and more preferably from 2.0 to 4.0% by mass. A polarizer wherein the content of iodine is in the above range has a transmittance in a preferable range. By use of this polarizer, a liquid crystal display wherein a contrast ratio in oblique directions is high can be obtained.

In the case where the PVA-based film contains potassium, a content of potassium is preferably from 0.2 to 1.0% by mass, and more preferably from 0.3 to 0.9% by mass. A polarizer wherein the content of potassium is in the above range has a transmittance in a preferable range and a relatively high polarization degree.

In the case where the PVA-based film contains boron, a content of boron is preferably from 0.5 to 3.0% by mass, more preferably from 1.0 to 2.8% by mass. A polarizer wherein the content of boron is in the above range has a transmittance in a preferable range and a relatively high polarization degree.

The polarizer may be used as it is. In general, however, the polarizer is used as an optical film subjected to various optical treatments known in the prior art when the polarizer is put into practical use. The optical treatments are not particularly limited as far as the treatments cause required optical properties to be satisfied. Examples thereof are treatments as described in the following a) to d): a) a transparent protective layer is laminated onto one surface or both surfaces of the polarizer in order to protect the polarizer; b) a surface of the above transparent protective layer (a surface of the protective layer opposite to a surface thereof bonded to the polarizer), or one surface or both surfaces of the polarizer is subjected to a surface treatment such as hard coating treatment, anti-reflecting treatment, sticking preventing treatment, or the like; c) an aligned liquid crystal layer is laminated thereon for the purpose of attaining viewing-angle-compensation, or the like; and d) a pressure-sensitive adhesive layer is laminated thereon in order to laminate a different film thereon.

In general, the polarizer is provided as a polarizing plate laminated a transparent protective layer onto both sides or one side of the polarizer. A material of the transparent protective layer is, for example, a layer excellent in transparency, mechanical strength, thermal stability, shielding property against humidity, isotropy, and the like.

The material which forms the transparent protective layer includes a polyester-based polymer such as polyethylene terephthalate and polyethylene naphthalate; cellulose-based polymer such as diacetylcellulose and triacetylcellulose; acrylic-based polymer such as polymethyl methacrylate; styrene-based polymer such as polystyrene and acrylonitrile-styrene copolymer (AS resin); polycarbonate-based polymer; and the like. Also, the material which forms the above transparent protective layer includes polyolefin-based polymer such as polyethylene, polypropylene, polyolefin having a cyclo-based or norbornene structure, and ethylene-propylene copolymer; vinyl chloride-based polymer; amide-based polymer such as nylon and aromatic polyimide; imide-based polymer; sulfone-based polymer; polyethersulfone-based polymer; polyetheretherketone-based polymer; polyphenylene sulfide-based polymer; vinyl alcohol-based polymer; vinylidene chloride-based polymer; vinyl butyral-based polymer; allylate-based polymer; polyoxymethylene-based polymer; epoxy-based polymer; blended product of these polymers described above; and the like. Also, the transparent protective layer may be a cured layer of thermosetting-type or ultraviolet-setting type polymer such as acrylic-based, urethane-based, acrylurethane-based, epoxy-based, silicone-based, and the like.

Of these, a triacetylcellulose film having a surface saponified with an alkali or the like is preferable as the transparent protective layer.

A thickness of the transparent protective layer is not particularly limited, and is generally 500 μm or less, preferably from 1 to 300 μm, and more preferably from 5 to 200 μm. A surface of the transparent protective layer is preferably saponified with an alkali or the like in order to improve the polarization property, the durability, the adhesive property, and the like.

<Retardation Layer>

A retardation layer used in the present invention is arranged between the first and the second polarizing plates. In the present specification, the "retardation layer" means a transparent layer having a retardation in the in-plane direction and/or the thickness direction.

The retardation layer is arranged between a liquid crystal cell and a first polarizer and/or between the liquid crystal cell and a second polarizer. The retardation layer may be a structure of single layer or plural layers.

An in-plane retardation value and/or a retardation value in the thickness direction of the above retardation layer at wavelength of 590 nm is 10 nm or more. A thickness of the retardation layer is preferably from 0.5 μm to 200 μm. A transmittance (T(590)) of the retardation layer at wavelength of 590 nm is preferably 90% or more.

The retardation layer is preferably arranged between the liquid crystal cell and the first polarizing plate (for example, the polarizer arranged on the viewing side of the liquid crystal cell). Moreover, the retardation layer is preferably arranged to make the slow axis direction of the retardation layer substantially perpendicular to the absorption axis direction of the polarizer adjacent thereto. Accordingly, when the retardation layer is arranged between the liquid crystal cell and the first polarizing plate, the slow axis direction of the retardation layer is preferably arranged substantially perpendicularly to the absorption axis direction of the first polarizer.

An index ellipsoid of the above retardation layer exhibits a relationship of $nx \geqq ny > nz$. In the present specification, "a relationship of $nx \geqq ny > nz$" means a relationship of $nx = ny > nz$ or $nx > ny > nz$ (also referred as negative biaxially).

Here, the nx represents an in-plane refractive index of the retardation layer in the X axis direction thereof. The ny represents an in-plane refractive index of the retardation layer in the Y axis direction thereof. The nz represents a refractive index in the direction perpendicular to the X axis direction and Y axis direction. The X axis direction is the direction in which an in-plane refractive index of the retardation layer is maximum and the Y axis direction is the direction perpendicular to the X axis direction in the plane.

It is preferable to use a retardation layer having an index ellipsoid exhibiting a relationship of $nx > ny > nz$. According to the use of such retardation layer, which has the index ellipsoid, the arrangement of only one of the retardation layer between the first and the second polarizers makes it possible to compensate a liquid crystal cell at a high level. Thus, a thin liquid crystal panel can be obtained at low costs. Moreover, a number of the retardation-layer-laminating operations is small; thus, the possibility that the slow axis of the retardation layer is shifted from a desired position becomes low, so that a liquid crystal display having a high contrast ratio in oblique directions can be obtained. A liquid crystal panel in a mode of using only one out of such retardation layer to attain compensation refers to a "liquid crystal panel in a single-layer compensation mode".

When the index ellipsoid of the retardation layer exhibits a relationship of $nx = ny > nz$, an Re[590] of the retardation layer is less than 10 nm, and preferably 5 nm or less. When the index ellipsoid of the retardation layer exhibits a relationship of $nx > ny > nz$, an Re[590] of the retardation layer is 10 nm or more, preferably from 20 nm to 80 nm, more preferably from 30 nm to 70 nm, and particularly preferably from 30 nm to 60 nm. The use of the retardation layer having the Re[590] in the above range makes it possible to obtain a liquid crystal display having excellent display characteristics wherein a contrast ratio in a front direction and that in oblique directions are high.

The Rth[590] of the retardation layer may be appropriately set in accordance with the retardation value in the thickness direction of the liquid crystal cell. The Rth[590] is preferably from 100 nm to 400 nm, more preferably from 150 nm to 350 nm, and particularly preferably from 150 nm to 300 nm. The use of the retardation layer having the Rth[590] in the above range makes it possible to obtain a liquid crystal display having excellent display characteristics wherein the contrast ratio in oblique directions is high.

When the index ellipsoid of the retardation layer exhibits a relationship of nx>ny>nz, the Rth[590] of the retardation layer is larger than the Re[590] thereof. Namely, an Nz coefficient of the retardation layer is larger than 1. The Nz coefficient is preferably more than 1.1, and 8 or less, more preferably from 2 to 7, and particularly preferably from 3 to 6. The use of the retardation layer having the Nz coefficient in the above range makes it possible to obtain a liquid crystal display having excellent display characteristics wherein the contrast ratio in a front direction and that in oblique directions are high.

Here, the Re[590] means an in-plane retardation value measured at 23° C., with wavelength of 590 nm. The Re[590] is calculated by an expression of Re[590]=(nx−ny)×d (d is a thickness of the retardation layer (nm)). The Rth[590] means the retardation value in the thickness direction measured at 23° C., with wavelength of 590 nm. The Rth[590] is calculated by an expression of Rth[590]={(nx+ny)/2−nz}×d (same as above). The Nz coefficient is calculated by an expression of Nz=(nx−nz)/(nx−ny).

A material for forming the retardation layer may be any appropriate material as far as the index ellipsoid of the retardation layer exhibits a relationship of nx≧ny>nz. The retardation layer preferably contains at least one resin selected from the group consisting of polyimide-based resin, polyester-based resin, norbornene-based resin, and cellulose-based resin. By forming the resin material(s) into a sheet form, the retardation layer, which satisfies the above-mentioned index ellipsoid, can be obtained.

(Polyimide-Based Resin)

When the polyimide-based resin is formed into a sheet form by a solvent casting method, molecules thereof are spontaneously aligned with ease in a step in which a solvent vaporizes. For this reason, a film prepared using the polyimide-based resin can be formed into a very thin film having an index ellipsoid exhibiting a relationship of nx=ny>nz. Accordingly, a film containing the polyimide-based resin can be preferably used as the retardation layer. A thickness of the polyimide-based-resin-containing retardation layer is preferably from 0.5 μm to 10 μm, and more preferably from 1 μm to 5 μm. A birefringence index ($\Delta n_{xz}$[590]) in the thickness direction of the polyimide-based-resin-containing retardation layer is preferably from 0.01 to 0.12, and more preferably from 0.02 to 0.08. Such the polyimide-based resin may be obtained by a method described in, for example, U.S. Pat. No. 5,344,916.

About the polyimide-based-resin-containing film, an index ellipsoid thereof exhibits a relationship of nx=ny>nz. For this reason, when this film is subjected to an ordinary longitudinal uniaxial drawing method or lateral uniaxial drawing method without being subjected to any complicated drawing methods, a film (retardation layer) having an index ellipsoid exhibiting a relationship of nx>ny>nz can be obtained. About this retardation layer, which has the index ellipsoid exhibiting the relationship of nx>ny>nz, the slow axis thereof easily becomes uniform in the width direction when the retardation layer is made into a wide form for large-sized displays, and the axis is scarcely shifted when the retardation layer is adhered onto one of the polarizers. For this reason, the use of the retardation layer makes it possible to obtain a liquid crystal display having a high contrast ratio in oblique directions.

The polyimide-based resin preferably has a hexafluoroisopropylidene group and/or a trifluoromethyl group. The polyimide-based resin preferably has at least repeating units represented by a general formula (I) illustrated below or repeating units represented by a general formula (II) illustrated below. The polyimide-based resin having these repeating units is excellent in transparency and solubility in widely-used solvents, and large in birefringence index in the thickness direction.

[Formula 1]

(I)

[Formula 2]

(II)

In the general formulas (I) and (II), the G and the G' represent a group, respectively, selected independently from the group consisting of a covalent bond, a $CH_2$ group, a $C(CH_3)_2$ group, a $C(CF_3)_2$ group, a $C(CX_3)_2$ group (X is halogen), a CO group, oxygen (O) atom, sulfur (S) atom, an $SO_2$ group, an $Si(CH_2CH_3)_2$ group, and an $N(CH_3)$ group. The G and the G' may be the same or different.

In the general formulas (I), the L is a substituent and its subscript e represents a number of the substituent. The substituent L is, for example, halogen, an alkyl group having 1 to 3 carbon number, a halogenated alkyl group having 1 to 3 carbon number, a phenyl group, or a substituted phenyl group, and when the number of the substituent L is plural, these Ls are the same or different. The subscript e is an integer from 0 to 3.

In the general formulas (II), the Q is a substituent and its subscript f represents a number of the substituent. The substituent Q is, for example, an atom or a group selected from the group consisting of hydrogen, halogen, an alkyl group, a substituted alkyl group, a nitro group, a cyano group, a thio-alkyl group, an alkoxy group, an aryl group, a substituted aryl group, an alkylester group and a substituted alkylester group, and when number of the substituent Q is plural, these Qs are the same or different. The subscript f is an integer from 0 to 4 and the subscript g and h are an integer from 1 to 3.

The polyimide-based resin can be obtained by, for example, reaction between a tetracarboxylic acid dianhydride and a diamine. The repeating units of the general formula (I) can be obtained by reaction between a diamine and a tetracarboxylic acid dianhydride having at least two aromatic rings. An example of the diamine includes, for example, 2,2'-bis(trifluoromethyl)-4,4'-diaminobiphenyl. The repeating units of the general formula (II) can be obtained by reaction between a tetracarboxylic acid dianhydride and a diamine having at least two aromatic rings. An Example of the tetracarboxylic acid dianhydride includes, for example, 2,2-bis(3,4-dicarboxyphenynhexafluoropropionic acid dianhydride. The reaction may be, for example, chemical imidization, which advances through two steps, or thermal imidization, which advances through one step.

As the tetracarboxylic acid dianhydride, any appropriate one may be selected. Examples of the tetracarboxylic acid dianhydride include, for example, 2,2-bis(3,4-dicarboxyphenyl)hexafluoropropanoic acid dianhydride, 3,3',4,4'-benzophenonetetracarboxylic acid dianhydride, 2,3,3',4-benzophenonetetracarboxylic acid dianhydride, 2,2',3,3'-benzophenonetetracarboxylic acid dianhydride, 2,2'-dibromo-4,4',5,5'-biphenyltetracarboxylic acid dianhydride, 2,2'-bis(trifluoromethyl)-4,4',5,5'-biphenyltetracarboxylic acid dianhydride, 3,3',4,4'-biphenyltetracarboxylic acid dianhydride, 4,4'-bis(3,4-dicarboxyphenyl)ether dianhydride, 4,4'-oxydiphthalic acid dianhydride, 4,4'-bis(3,4-dicarboxyphenyl)sulfonic acid dianhydride, bis(2,3-dicarboxyphenyl)methanoic acid dianhydride, bis(3,4-dicarboxyphenyl) diethylsilanoic acid dianhydride, and the like.

As the diamine, any appropriate one may be selected. Examples of the diamine include, for example, 2,2'-bis(trifluoromethyl)-4,4'-diaminobiphenyl, 4,4'-diaminobiphenyl, 4,4'-diaminophenylmethane, 4-4'-(9-fluorenilidene)-dianiline, 3,3'-dichloro-4,4'-diaminodiphenylmethane, 2,2'-dichloro-4,4'-diaminobiphenyl, 4,4'-diaminodiphenylether, 3,4'-diaminodiphenylether, 4,4'-diaminodiphenylsulfone, 4,4'-diaminodiphenylthioether, and the like.

A weight-average molecular weight (Mw) of the polyimide-based resin is preferably from 20,000 to 180,000. The weight-average molecular weight (Mw) of the polyimide-based resin is based on the weight-average molecular weight of polyethylene oxide which is used as a standard sample, and using a dimethylformamide solution (a solution obtained by adding 10 mM of lithium bromide and 10 mM of phosphoric acid, and then adding dimethylformamide to the resultant up to a total volume of 1 L (1 liter)) as a developing solvent.

An imidization rate of the polyimide-based resin is preferably 95% or more. The imidization rate can be calculated by the ratio in integrated intensity between a proton peak originating from a polyamic acid which is a precursor of the polyimide and a proton peak originating from the polyimide.

The polyimide-based-resin-containing retardation layer may be obtained by any appropriate shape-forming method. The polyimide-based-resin-containing retardation layer can be preferably formed by drawing a polyimide-based film formed into a sheet form by a solvent casting method. The method for the drawing may be longitudinal uniaxial drawing, lateral uniaxial drawing, or the like. A temperature at which the polyimide-based film is drawn (drawing temperature) is preferably from 120° C. to 200° C. A ratio at which the polyimide-based film is drawn (draw ratio) is preferably more than 1 and 3 times or less.

<Liquid Crystal Display>

A liquid crystal display of the present invention is provided with the above-mentioned liquid crystal panel.

The liquid crystal display of the present invention can be applied to any of a transmission type, reflection type, or semi-transmission type display.

In the case of, for example, the liquid crystal display of the transmission type, the display is provided with at least a liquid crystal panel, and a backlight unit arranged on the side opposite to the viewing side of the liquid crystal panel. The backlight unit may be a directly-underlaid type or a sidelight type.

When the directly-underlaid type is adopted, the backlight unit is preferably provided with at least a light source, a reflecting film, a diffuser, a prism sheet, and a luminance enhancing film. When the sidelight type is adopted, the backlight unit is preferably provided with at least a light guide plate, and a light refractor besides the above-mentioned constituents.

A liquid crystal display of the present invention is used for wide applications. Examples of the application include office automation equipments such as a personal computer monitor, a notebook computer and a copying machine; portable equipments such as a portable telephone, a watch, a digital camera, a personal digital assistant (PDA) and a portable game machine; domestic electrical equipments such as a video camera, a television and a microwave oven; on-vehicle equipments such as a back monitor, a monitor for a car navigation system and a car audio; display equipments such as an information monitor for a commercial store; security equipments such as an observation monitor; and care/medical equipments such as a care monitor and a medical monitor; and the like.

The application of the liquid crystal display of the present invention is preferably a television. A screen size of the television (a length of diagonal lines of its rectangular screen) is preferably 70 inches or more, more preferably 80 inches or more, and particularly preferably 100 inches or more.

EXAMPLES

The present invention will be further described by way of examples and comparative examples. The present invention is not limited only to the following examples.

Individual analyzing methods used in examples and comparative examples are as follows:

(1) Method for measuring single transmittance of any polarizers:

A spectrophotometer [product name: "DOT-3", manufactured by Murakami Color Research Laboratory Co., Ltd.] was used to measure the single transmittance. The single transmittance is the Y value of tristimulus values based on the two-degree field according to JIS Z 8701-1995.

(2) Method for measuring polarization degree of any polarizers, and perpendicular transmittances thereof at wavelengths of 440 nm, 550 nm, and 660 nm:

The spectrophotometer [product name: "DOT-3", manufactured by Murakami Color Research Laboratory Co., Ltd.] was used to measure the parallel transmittance ($H_0$) of any polarizer, and the perpendicular transmittance ($H_{90}$) thereof, and the polarization degree was calculated from the following expression: polarization degree (%)={$(H_0-H_{90})/(H_0+H_{90})$}$^{1/2}$×100. The parallel transmittance ($H_0$) is a value of a transmittance of a parallel laminated polarizer formed by putting two identical polarizers onto each other so as to make their absorption axes parallel to each other. The perpendicular transmittance ($H_{90}$) is a value of a transmittance of a perpendicular laminated polarizer formed by putting two identical polarizers onto each other so as to make their absorption axes perpendicular to each other. These transmittances are each a Y value obtained by making a visibility correction in accordance with the two-degree field (C light source) according to JIS Z 8701-1982.

(3) Method for measuring dichroic ratio of any polarizers:

The spectrophotometer [product name: "DOT-3", manufactured by Murakami Color Research Laboratory Co., Ltd.] was used to measure a $T_{ave}$ and a P of any polarizer. The dichroic ratio was calculated from the following expression: Dichroic Ratio DR=A(⊥)/A(∥)=log {$(T_{ave}/100)\times(1-P/100)$}/log {$(T_{ave}/100)\times(1+P/100)$}.

The $T_{ave}$ is an average value of the single transmittances of the two polarizers used in the measurement, and the P is the above-mentioned polarization degree.

(4) Method for measuring content of each of elements (I and K)

A circular sample having a diameter of 10 mm was measured by fluorescent X-ray analysis under conditions described below. From the resultant of X-ray intensity, the content of each of the elements was calculated on the basis of a calibration curve prepared in advance by use of a standard sample.

Analysis device: fluorescent X-ray analyzer (XRF) Product name: "ZSX 100e", manufactured by Rigaku Corporation.

Counter cathode: rhodium
Dispersive crystal: lithium fluoride
Exciting light energy: 40 kV-90 mA
Iodine measuring ray: I-LA
Potassium measuring ray: K-KA
Quantity measuring method: FP method
2θ angle peak: 103.078 degrees (iodine), 136.847 degrees (potassium)
Measuring period: 40 seconds (5) Method for measuring retardation values (Re[λ] and Rth [λ]), Nz coefficient, and T[590] of retardation layer:

A product (trade name: "KOBRA 21-ADH") manufactured by Oji Scientific Instruments was used to measure the values at 23° C. The used average refractive index was a value measured with an Abbe refractometer [trade name: "DR-M4", manufactured by Atago Co., Ltd.].

(6) Method for measuring birefringence index ($\Delta n_{xy}[1000]$) and retardation value ($\Delta n_{xy}\times d$) of any polarizers:

A product (trade name: "KOBRA-31X100/IR") manufactured by Oji Scientific Instruments used to measure the values at wavelength of 1000 nm and 23° C.

(7) Method for measuring thickness:

When the thickness was less than 10 μm, a spectrophotometer for thin films [product name: "SHUNKAN [transliteration] MULTI PHOTOMETRY SYSTEM MCPD-2000", manufactured by Otsuka Electronics Co., Ltd.] was used to measure the thickness. When the thickness was 10 μm or more, a digital micrometer "KC-351C model" manufactured by Anritsu Corporation was used to measure the thickness.

(8) Method for measuring molecular weight of any polyimide-based resin

The molecular weight was calculated out by gel permeation chromatography (GPC) using polyethylene oxide as a standard sample. An apparatus, tools, and conditions for the measurement are as follows:

Sample: a sample was dissolved in an eluent to prepare a 0.1% by mass solution thereof.

Pretreatment: the sample was allowed to stand still for 8 hours, and then filtrated through a 0.45-μm membrane filter.

Analyzer: "HLC-8020GPC", manufactured by Tosoh Corporation

Columns: $GMH_{XL}+GMH_{XL}+G2500H_{XL}$, manufactured by Tosoh Corporation

Column size: each of the columns=7.8 mmφ×30 cm (total: 90 cm)

Eluent: dimethylformamide (a solution obtained by adding 10 mM of lithium bromide and 10 mM of phosphoric acid, and then adding dimethylformamide to the resultant up to a total volume of 1 L)

Flow rate: 0.8 mL/min.
Detector: RI (differential refractometer)
Column temperature: 40° C.
Injected amount: 100 μL (9) Method for measuring contrast ratio in any liquid crystal displays:

After 30 minutes passed from a time when its backlight was turned on in a dark room at 23° C., a product (product name: "EZ Contrast 160D") manufactured by Eldim Company was used to measure the Y values in the XYZ display system at azimuth angles from 0° to 360° and a polar angle of 60° in a display screen when a white image and a black image were displayed. From the Y value (YW) of the white image and the Y value (YB) of the black image, the ratio between the contrast (i.e., the contrast ratio) "YW/YB" in the oblique direction was calculated out. Here, the long sides of the liquid crystal panel was set to an azimuth angle of 0°, and the normal direction thereof was set to a polar angle of 0°.

Production Example 1 of Polarizers

A non-drawn film [trade name: "VF-PS #7500", manufactured by Kuraray Co., Ltd.], 75 μm in thickness, made mainly of a polyvinyl-alcohol-based resin was immersed into five baths under conditions described below while a tension was applied to the film along the longitudinal direction of the film. In this way, the film was drawn to set the final drawn length 4.5 times longer than the original length of the film. This drawn film was dried in an air-circulating drying oven of 60° C. temperature for one minutes. In such a way, polarizers A, 40 μm in thickness, were produced. About the resultant polarizers A, measured results of a single transmittance, a birefringence index ($\Delta n_{xy}$) at wavelength of 1000 nm, and others are shown in Table 1.

<Conditions>

(1) Swelling bath: pure water 30° C. in temperature; immersing period: 60 seconds (2) Dyeing bath: aqueous solution, 30° C. in temperature, containing 0.038% by mass of iodine and 0.2% by mass of potassium iodide; immersing period: 65 seconds (3) First crosslinking bath: aqueous solution, 40° C. in temperature, containing 3% by mass of potassium iodide and 3% by mass of boric acid; immersing period: 25 seconds (4) Second crosslinking bath: aqueous solution, 60° C. in temperature, containing 5% by mass of potassium iodide and 4% by mass of boric acid; immersing period: 40 seconds (5) Water washing bath: aqueous solution, 25° C. in temperature, containing 3% by mass of potassium iodide; immersing period: 10 seconds Polymeric films (trade name: "UZ-TAC"; Re[590]=1 nm, and Rth[590]=60 nm) manufactured by Fuji Photo Film Co., Ltd., each having a thickness of 80 μm and containing a cellulose-based resin were adhered onto both sides of each of the polarizers A, respectively, through a water-soluble adhesive (trade name: "GOSEFIMER [transliteration] Z200, manufactured by Nippon Synthetic Chemical Industry Co., Ltd.), made mainly of a polyvinyl-alcohol-based resin. In such a way, the polarizing plates A were produced.

TABLE 1

|  | Polarizer A (drawn 4.5 times) | Polarizer B (drawn 6.0 times) |
| --- | --- | --- |
| Single transmittance (%) | 39.2 | 42.9 |
| Parallel transmittance (%) | 30.5 | 36.5 |
| Perpendicular transmittance (%) | 0.0020 | 0.0030 |
| Polarization degree (%) | 99.99 | 99.99 |
| Iodine content (% by mass) | 4.6 | 2.6 |
| Potassium content (% by mass) | 1.1 | 0.6 |
| Perpendicular transmittance (%) at wavelength of 440 nm | 0.006 | 0.023 |
| Perpendicular transmittance (%) at wavelength of 550 nm | 0.001 | 0.002 |
| Perpendicular transmittance (%) at wavelength of 660 nm | 0.001 | 0.003 |
| Birefringence index($\Delta n_{xy}$) | 0.019 | 0.036 |
| In-plane retardation value ($\Delta n_{xy} \cdot d$) | 756 | 900 |
| Dichroic ratio | 62.2 | 133.6 |

Production Example 2 of Polarizers

Polarizers B were produced in the same way as in Production Example 1 of the polarizers except that 0.025% by mass of iodine was added to the dyeing bath and the film was drawn to set the final drawn length 6.0 times longer than the original length of the film. About the resultant polarizers B, measured results of a single transmittance, a birefringence index ($\Delta n_{xy}$) at wavelength of 1000 nm, and others are shown in Table 1.

In the same way as in Production Example 1 of the polarizers, polymeric films, each containing a cellulose-based resin, were adhered onto both sides of each of the polarizers B, respectively. In such a way, the polarizing plates B were produced.

Production Example 3 of Polarizers

Polarizers C were produced in the same way as in Production Example 1 of the polarizers except that the concentration of iodine in the dyeing bath was made high. About the resultant polarizers C, a dichroic ratio and a single transmittance were measured. As a result, the dichroic ratio was 48.5, and the single transmittance was 36.8%.

In the same way as in Production Example 1 of the polarizers, polymeric films, each containing a cellulose-based resin, were adhered onto both sides of each of the polarizers C, respectively. In such a way, the polarizing plates C were produced.

Production Example 4 of Polarizers

Polarizers D were produced in the same way as in Production Example 1 of the polarizers except that the concentration of iodine in the dyeing bath was made low. About the resultant polarizers D, a dichroic ratio and a single transmittance were measured. As a result, the dichroic ratio was 91.4, and the single transmittance was 42.9%.

In the same way as in Production Example 1 of the polarizers, polymeric films, each containing a cellulose-based resin, were adhered onto both sides of each of the polarizers D, respectively. In such a way, the polarizing plates D were produced.

[Production of Retardation Layer]

Into a reaction container (500 mL) equipped with a mechanical stirrer, a Dean-Stark apparatus, a nitrogen-introducing tube, a thermometer, and a condenser tube were added 17.77 g (40 mmol) of 2,2'-bis(3,4-dicarboxyphenyl) hexafluoropropionic acid dianhydride [manufactured by Clariant (Japan) K.K.] and 12.81 g (40 mmol) of 2,2-bis (trifluoromethyl)-4,4'-diaminobiphenyl [manufactured by Wakayama Seika Kogyo Co., Ltd.]. Subsequently, thereto was added a solution wherein 2.58 g (20 mmol) of isoquinoline was dissolved in 275.21 g of m-cresol, and the resultant was stirred (at 600 rpm) at 23° C. for 1 hour, so as to obtain a homogeneous solution. Next, an oil bath was used to heat the reaction container to set the temperature of the inside of the reaction container to 180±3° C. While the temperature was kept, the solution was stirred for 5 hours to obtain a yellow solution. The solution was further stirred for 3 hours, and then the heating and the stirring were stopped. The resultant was naturally cooled to return the temperature to room temperature. As a result, a polymer in a gel form was precipitated.

Acetone was added to the yellow solution in the reaction container to dissolve the gel completely. In this way, a diluted solution (7% by mass) was produced. This diluted solution was added little by little to 2 L of isopropyl alcohol while the alcohol was stirred. In this way, white powder was precipitated. This powder was collected by filtration, and put into 1.5 L of isopropyl alcohol so as to be washed. Furthermore, the same operation was repeated once more to wash the powder. Thereafter, the powder was again collected by filtration. This was dried in an air-circulating thermostatic oven 60° C. in temperature for 48 hours. Thereafter, the powder was dried at 150° C. for 7 hours to obtain powder of a polyimide of a structural formula (III) illustrated below with a yield content of 85%. A weight-average molecular weight (Mw) of the polyimide was 124,000, and an imidization rate was 99.9%.

[Formula 3]

(III)

The polyimide powder was dissolved into methyl isobutyl ketone to prepare a 15% by mass solution of the polyimide. This polyimide solution was cast into a sheet form uniformly onto a surface of a triacetylcellulose film (thickness: 80 μm) with a slot die coater. Next, the film was put into an air-circulating drying oven having plural chambers. The solvent was then vaporized while the temperature was gradually raised from a low temperature as follows: the temperature was kept at 80° C. for 2 minutes, at 135° C. for 5 minutes, and at 150° C. for 10 minutes. Next, the film was drawn 1.14 times at 147° C. by a fixed-end lateral uniaxial drawing method using a tenter drawing machine. Next, the triacetylcellulose film was peeled off to obtain a polyimide layer (retardation layer) 3.4 μm in thickness. This retardation layer had an index ellipsoid exhibiting a relationship of nx>ny>nz and the following properties: a T[590]=91%, an Re[590]=50 nm, an Rth[590]=210 nm, and an Nz coefficient=4.2.

[Preparation of Liquid Crystal Cell]

A liquid crystal panel was taken out from commercially available liquid crystal display [40-inch liquid crystal television manufactured by Sony Corporation; trade name: "BRAVIA KDL-40X1000"], containing a liquid crystal cell in a VA mode, and then all optical films, such as polarizing plates, arranged on front-back both sides of the liquid crystal cell were removed. The front and back surfaces of glass plates of this liquid crystal cell were washed. In such a way, the liquid crystal cell was obtained.

Example 1

The retardation layer produced as described above was adhered onto the viewing side of the liquid crystal cell prepared as described above through an acrylic-based pressure-sensitive adhesive 20 μm in thickness. The adhesion of the retardation layer was performed to make the slow axis direction of the retardation layer substantially perpendicular to the long side direction of the liquid crystal cell. Next, one of the polarizing plates A in Production Example 1 was adhered onto a surface of the retardation layer (a surface opposite to the surface on which the liquid crystal cell was adhered) through an acrylic pressure-sensitive adhesive 20 μm in thickness. The adhesion of the polarizing plate A (referred to as the first polarizing plate hereinafter) laminated on the retardation layer was performed to make the absorption axis direction thereof substantially parallel to the long side direction of the liquid crystal cell. Next, one of the polarizing plates A in Production Example 1 was adhered onto the side (backlight side) opposite to the viewing side of the liquid crystal cell through an acrylic-based pressure-sensitive adhesive 20 μm in thickness. The adhesion of the polarizing plate A on the opposite side of the liquid crystal cell (referred to as the second polarizing plate hereinafter) was performed to make the absorption axis direction thereof substantially perpendicular to the long side direction of the liquid crystal cell.

Accordingly, about the first and the second polarizing plates, the absorption axis directions thereof were substantially perpendicular to each other. The slow axis direction of the retardation layer was also substantially perpendicular to the absorption axis direction of the first polarizing plate.

Figure 1:
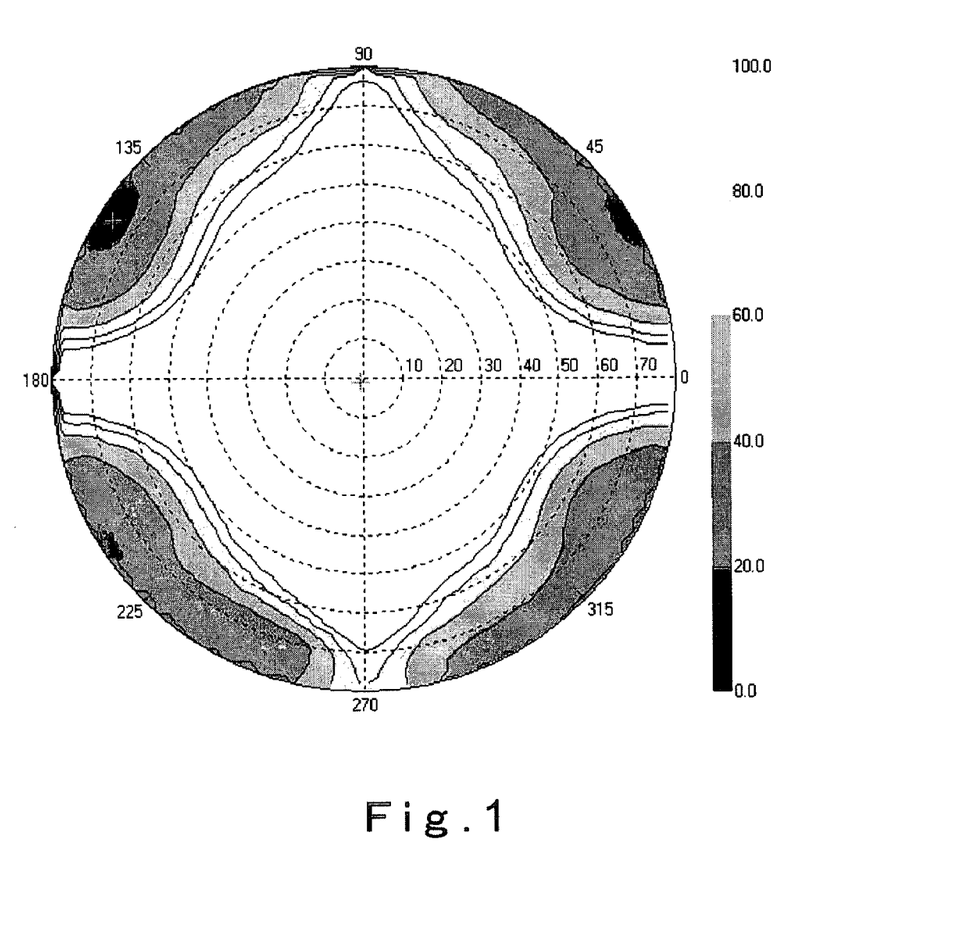
FIG. 1 is a contrast contour map of a liquid crystal panel of Example 1.
Figure 3:
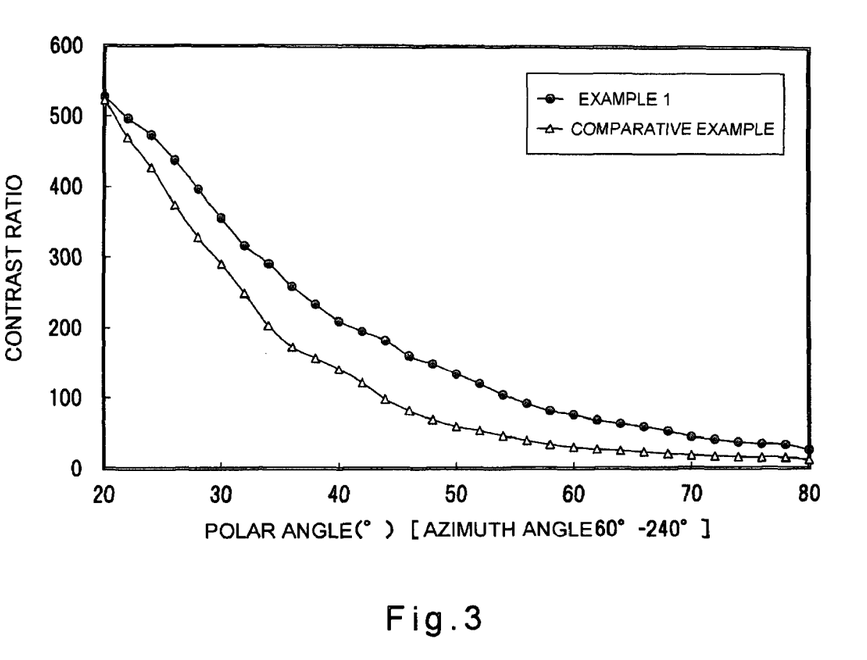
FIG. 3 is a graph of a contrast ratio in Example 1 and that in Comparative Example.

The liquid crystal panel thus obtained was combined with a backlight unit of the original liquid crystal display, which was taken out as described above, so as to produce a liquid crystal display according to Example 1. Characteristics of the resultant liquid crystal display are shown in FIGS. 1 and 3.

In this liquid crystal display, a contrast ratio at an azimuth angle of 45 degrees and a polar angle of 60 degrees was 58.

Example 2

A liquid crystal panel and a liquid crystal display were produced in the same way as in Example 1 except that the polarizing plates C produced in Production Example 3 were used as the first and the second polarizing plates. In this liquid crystal display, a contrast ratio at an azimuth angle of 45 degrees and a polar angle of 60 degrees was 47.

Example 3

A liquid crystal panel and a liquid crystal display were produced in the same way as in Example 1 except that the polarizing plates D produced in Production Example 4 were used as the first and the second polarizing plates. In this liquid crystal display, a contrast ratio at an azimuth angle of 45 degrees and a polar angle of 60 degrees was 45.

Comparative Example

Figure 2:
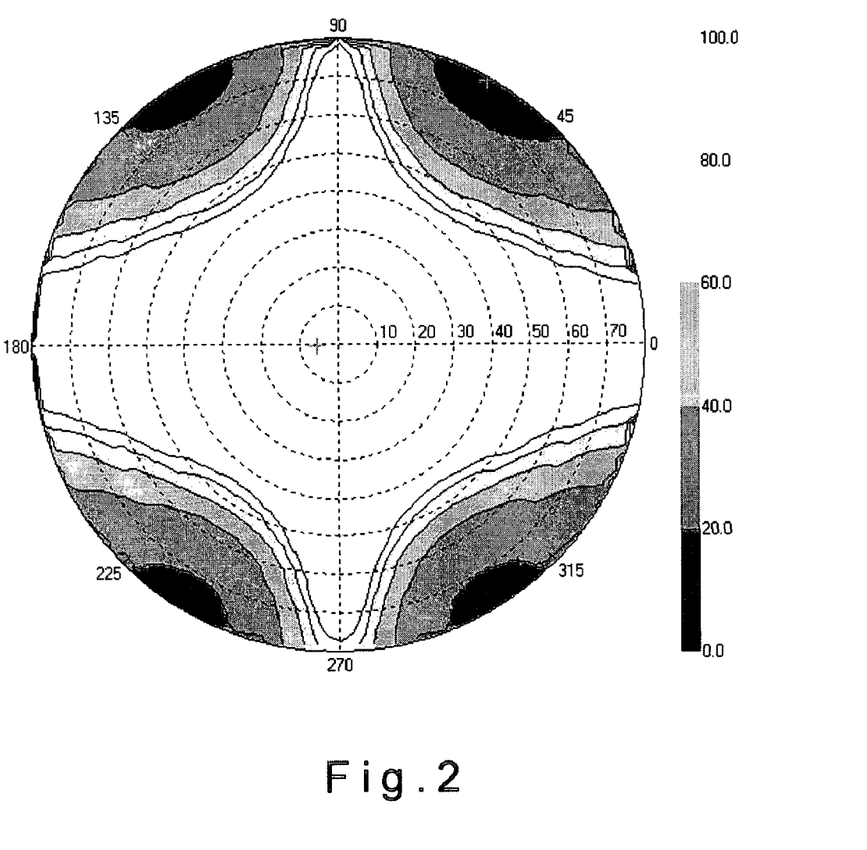
FIG. 2 is a contrast contour map of a liquid crystal panel of Comparative Example.

A liquid crystal panel and a liquid crystal display were produced in the same way as in Example 1 except that the polarizing plates B produced in Production Example 2 were used as the first and the second polarizing plates. Characteristics of the resultant liquid crystal display of Comparative Example are shown in FIGS. 2 and 3. In this liquid crystal display, a contrast ratio at an azimuth angle of 45 degrees and a polar angle of 60 degrees was 32.

<Evaluation>

As is clear from Examples 1 to 3 and Comparative Example, in the liquid crystal displays provided with the liquid crystal panels of the Examples, respectively, a contrast ratio in oblique directions was remarkably higher than in the liquid crystal display using the liquid crystal panel according to the Comparative Example.

What is claimed is:

1. A liquid crystal panel, comprising a liquid crystal cell, a retardation layer, a first polarizer arranged on one side of the liquid crystal cell, and a second polarizer arranged on another side of the liquid crystal cell that is opposite to the first polarizer,
    wherein at least one of the first polarizer and the second polarizers is dyed with a dichroic material, and a dichroic ratio of the dyed polarizer is 40 to 100,
    the retardation layer is arranged between the liquid crystal cell and the first polarizer or the second polarizer, and
    an index ellipsoid of the retardation layer exhibits a following relationship: nx≧ny>nz.

2. The liquid crystal panel according to claim 1, wherein at least one of the polarizers has a polarization degree of 99% or more and a single transmittance of 35% to 45%.

3. The liquid crystal panel according to claim 1, wherein at least one of the polarizers has the following birefringence: $\Delta n_{xy}$ is 0.015 to 0.030,
    wherein $\Delta n_{xy}$=nx−ny, the nx represents an in-plane refractive index of the polarizer in the X axis direction thereof, and the ny represents an in-plane refractive index of the polarizer in the Y axis direction thereof, provided that the X axis direction is a direction in which an in-plane refractive index of the polarizer is maximum and the Y axis direction is a direction perpendicular to the X axis direction.

4. The liquid crystal panel according to claim 1, wherein at least one of the polarizers comprises a drawn polymer film dyed with a dichroic material.

5. The liquid crystal panel according to claim 4, wherein the drawn polymer film dyed with the dichroic material is obtained by steps comprising:
    a step of swelling a non-drawn hydrophilic polymer film, then
    a step of dyeing with the dichroic material the swelled polymer film, then
    a step of crosslinking the dyed polymer film, then a step of washing the crosslinked polymer film, and a step of drawing the polymer film into a length 3 to 5 times longer than the original length of the polymer film in a period from the swelling step to the washing step.

6. The liquid crystal panel according to claim 4, wherein the drawn polymer film comprises a polyvinyl-alcohol-based film, and the dichroic material comprises iodine.

7. The liquid crystal panel according to claim 1, which has a panel size of 70 inches or more.

8. The liquid crystal panel according to claim 1, wherein the liquid crystal cell contains liquid crystal molecules aligned to homeotropic alignment when no electric field is applied thereto.

9. The liquid crystal panel according to claim 1, wherein an Nz coefficient of the retardation layer is from 1.1 to 8.0.

10. The liquid crystal panel according to claim 1, wherein the retardation layer contains at least one resin selected from the group consisting of polyimide-based resin, polyester-based resin, norbornene-based resin and cellulose-based resin.

11. The liquid crystal panel according to claim 1, wherein the retardation layer comprises a polyimide-based resin layer and a cellulose-based resin layer.

12. A liquid crystal display, comprising a liquid crystal panel as recited in claim 1.

13. The liquid crystal panel according to claim 1, wherein the dyed polarizer has a polarization degree of 99% or more and a single transmittance of 35% to 45% and the following birefringence: $\Delta n_{xy}$ is from 0.015 to 0.030, wherein $\Delta n_{xy}=nx-ny$, the nx represents an in-plane refractive index of the polarizer in the X axis direction thereof, and the ny represents an in-plane refractive index of the polarizer in the Y axis direction thereof, provided that the X axis direction is a direction in which an in-plane refractive index of the polarizer is maximum and the Y axis direction is a direction perpendicular to the X axis direction.

14. The liquid crystal panel according to claim 1, wherein the dichroic ratio of the dyed polarizer is 50 to 70.

15. The liquid crystal panel according to claim 1, wherein the first polarizer and the second polarizer are dyed.

16. The liquid crystal panel according to claim 1, wherein the dyed polarizer is the first polarizer arranged on the viewing side of the liquid crystal cell.

17. The liquid crystal panel according to claim 2, wherein the single transmittance is 39% to 42%.

18. The liquid crystal panel according to claim 1, wherein at least one of the polarizers has a parallel transmittance of 27% to 36%.

19. The liquid crystal panel according to claim 1, wherein at least one of the polarizers has a perpendicular transmittance of up to 0.0030%.

20. The liquid crystal panel according to claim 1, wherein at least one of the polarizers has a single transmittance of 35% to 45%, a parallel transmittance of 27% to 36% and a perpendicular transmittance of up to 0.0030%.

21. The liquid crystal panel according to claim 1, wherein the dyed polarizer has a single transmittance of 35% to 45%, a parallel transmittance of 27% to 36% and a perpendicular transmittance of up to 0.0030%.

* * * * *